Patented Apr. 10, 1945

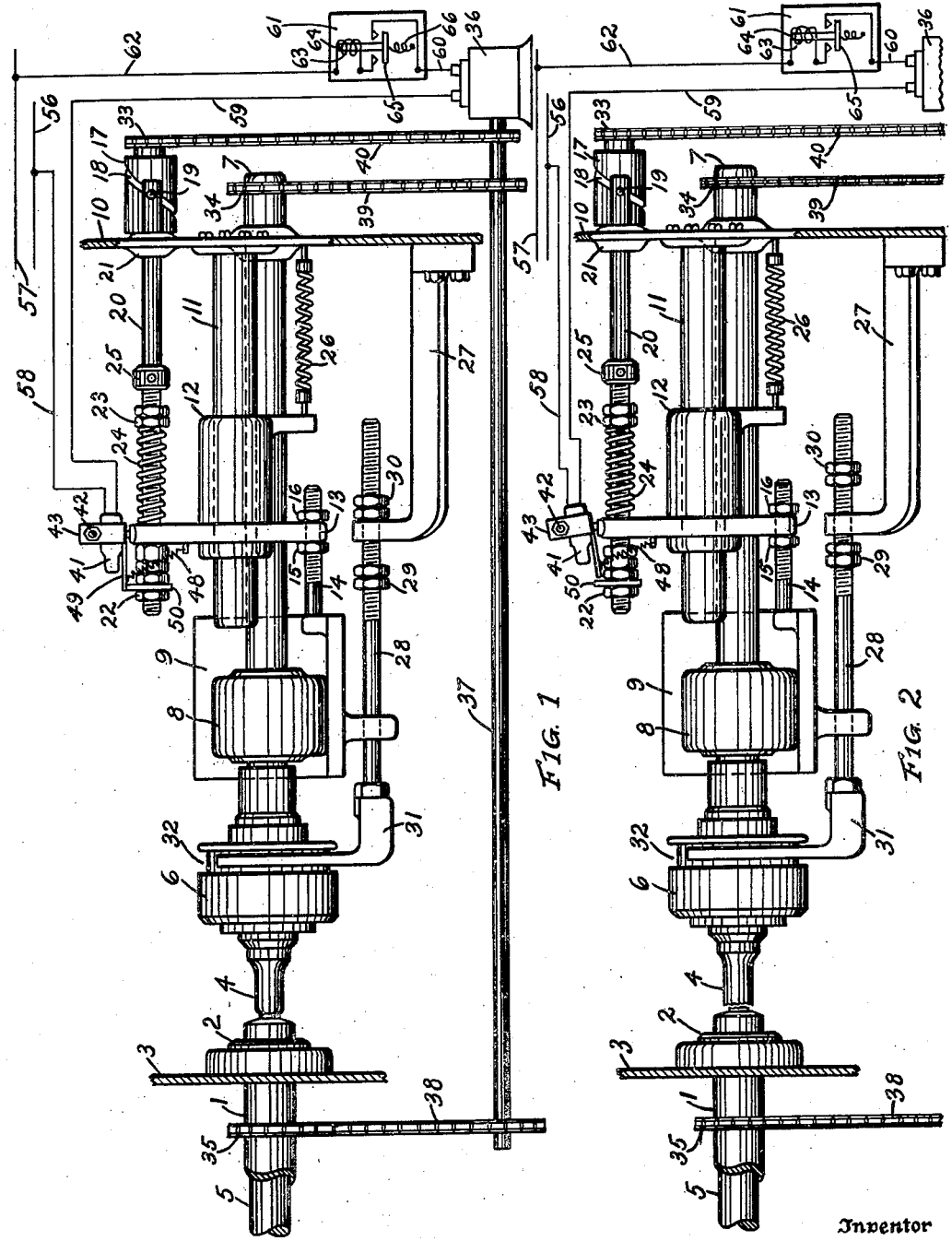

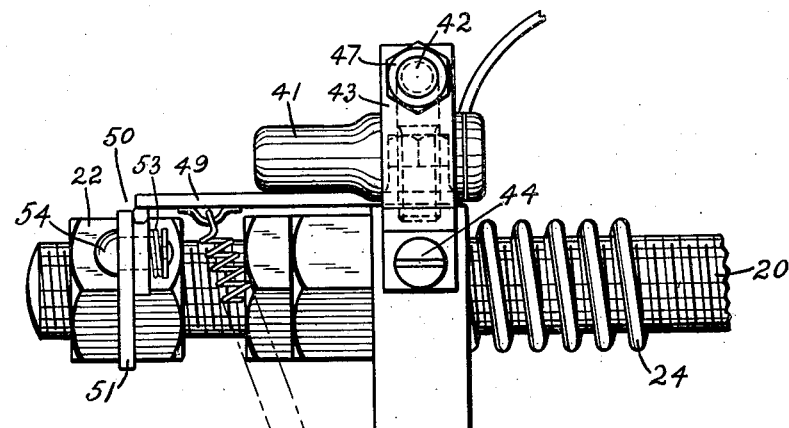
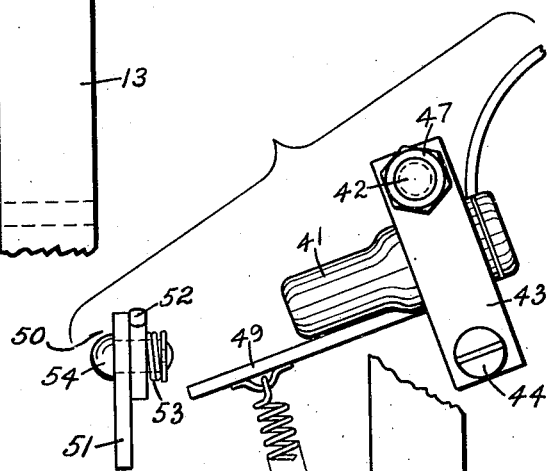
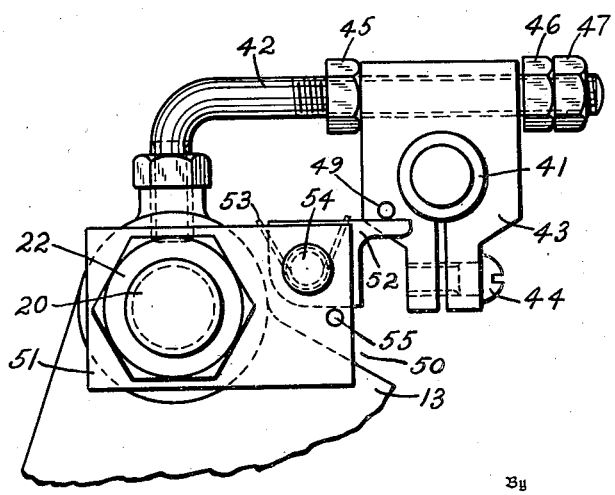

2,373,619

UNITED STATES PATENT OFFICE 2,373,619

SAFETY DEVICE FOR AUTOMATIC SCREW MACHINES

Arthur Vajda, Mansfield, Ohio, assignor to The Ohio Brass Company, Mansfield, Ohio, a corporation of New Jersey Application December 14, 1943, Serial No. 514,303

12 Claims. (Cl. 10—89)

This invention relates to machine tools and in its more specific aspects is directed to a safety device intended to interrupt the power circuit to the machine when one of the work pieces is broken off in the threading die mechanism operating on the work piece.

The object of this invention is to provide a machine tool of the chucking or screw machine type with a means for stopping the drive motor whenever one of the work pieces is unintentionally broken from or severed from the bar stock and remains in the chuck or threading die engaging same.

A further object of the invention is to associate a switch included in the drive motor circuit that is openable when a broken or severed work piece is held in one of the chucks of the machine tool.

A still further object of the invention is to associate an electric switch device with two relatively movable parts of a screw machine threading die or chuck operating mechanism which upon relative movement will open said switch thereby stopping the machine tool.

A further object of the invention is to prevent motion in the turret of a screw machine or to have the motion arrested in the screw machine when a broken work piece is left in one of the threading dies or chucks of the screw machine.

Another and still further object of the invention is to provide a safety mechanism for a screw machine in which the machine motion will be arrested when one of the work pieces operated upon becomes severed from the bar stock and then remains in the threading die or one of the chucks of the screw machine thereby preventing breakage or other damage to the machine.

Other and further objects of the invention will occur to those skilled in the arts to which this invention pertains as the description proceeds which taken in connection with the accompanying drawings sets forth a preferred embodiment thereof but such disclosure is not to be construed as a limitation of the invention which is limited only by the appended claims and any and all modifications, alterations and variations of structure coming within the spirit and scope thereof is deemed to be included herein.

In the drawings:

Fig. 1 shows a plan view partly schematic of the essential operating mechanism.

Fig. 2 shows a plan view of the mechanism of Fig. 1 in a different sequence of operation.

Fig. 3 shows an enlarged view of the switch mechanism.

Fig. 4 shows the switch in a tripped position.

Fig. 5 is an end view of the mechanism shown in Fig. 3.

In the performance of some tooling operations employed on automatic screw machines it sometimes happens that the point of support for the work piece on the bar stock from which it is cut is not strong enough for it to withstand the cutting tool torsion or thrust imposed on it causing it to break off and remain in the chuck or threading die mechanism and held therein thereby interfering with the orderly indexing and other operations of the machine. When these work pieces become severed or broken off from the bar stock they prevent the machine from functioning properly by getting in the way of the succeeding advancing work piece, are apt to become entangled with the tools, prevent the entering of the next work piece as well as the succeeding work pieces and unless speedily removed may damage the entire machine. The difficulty arises when the next advancing work piece seeks to enter the threading die it is prevented from doing so because the previous or severed piece is still held therein. This places undue strain on all machine parts and breakage of the turret feed or the die spindle feed or the parts themselves result. Applicant has therefore developed and invented a device particularly applicable to automatic screw machines adapted to interrupt the circuit to the drive motor, thereby stopping the motor when said device, which incorporates a switch, operates or is caused to operate whenever a work piece prematurely bends, breaks from or seeks to break away from the stock from which it is being cut, thereby failing to release whereupon the succeeding work piece cannot enter the chuck or threading die and be engaged by the said chuck or die. In that event the work piece causes the switch device to operate by relatively moving the feed and die mechanism thereby opening the drive motor circuit. The safety switch cannot be reclosed or the motor started until the troublesome condition has been corrected.

The attainment of the above objects and advantages is accomplished in a device disclosed in the several drawings in which 1 represents one of the several drive shafts of a screw machine turret structure, the latter not being shown in complete detail, and 2 shows one of the work holders or headstocks of the said turret and 3 schematically illustrates the turret support.

The work piece 4 is shown in Fig. 1 as supported at its one end on the bar stock 5 held in the headstock 2 and its other end as engaged by a collapsible threading die 6 or which may be a collapsible chuck structure each of which may be of a more or less conventional design mounted on the end of a shaft 7 supported for rotation in a journal 8 fixed to the support 9 movable relatively to the frame of the machine a portion of which is schematically illustrated at 10.

Fixed to the machine frame is a support 11 on which slides an extended cylindrical sleeve element 12 having a secondary or yoke support 13 secured thereto. At one end of yoke support 13 a rod 14 is inserted through an appropriate opening therein and held with respect thereto by nuts or securing elements 15 and 16 and the other end of the rod is rigidly secured to the support 9 in order that it may move in unison with the yoke support 13.

A cylindrical cam element 17 is rotatably supported with respect to the frame 10. The cam 17 has a track 18 of appropriate contour formed therein in which a cam follower (not shown) is operably arranged, rotatably mounted on a pin or shaft 19, the latter secured in an extension of the rod 20 that is axially slidably mounted in a bushing 21 fixed in the frame 10. The rod 20 at its other end is inserted through another aperture in the yoke support 13 and under certain conditions is intended to move relatively of the said yoke support 13. A plurality of nuts 22 are arranged on one end of the rod 20 on one side of the yoke 13 and a pair of nuts 23 are locked on the other side of the said yoke support 13 on rod 20 with a spring 24 interposed between the yoke support 13 and the nuts 23, as shown, to urge the yoke 13 forward and keep it in engagement with one of the nuts 22. In the event nuts 23 should work loose a collar 25 on the rod 20 will arrest any motion of the spring 24. When the cam 17 rotates it will move rod 20 axially of the bushing 21, and the sleeve 12 and yoke 13 will move forward relatively of the fixed support 11 due to compression set up by the spring 24, and thereby the support 9, bearing 8, chuck or threading die 6 will be moved forward in unison with the yoke for reasons given above. To aid in retracting the sleeve 12 a tension spring 26 is interposed between the frame 10 and sleeve 12. The forward motion of the sleeve 12 and yoke 13 is effected by the compression of spring 24 against the tension of spring 26 while the return motion is aided by spring 26. The function of the possible relative motion between rod 20 and yoke support 13 will be subsequently set forth.

The opening and closing of the rotatable chuck or threading die 6 is accomplished at the proper time in each sequence of operation. A bracket 27 is shown secured to the frame 10 and at its one end is provided with a right angular portion appropriately perforated to slidably receive a rod 28 having two pairs of nut elements 29, 30 thereon. A fork element 31 is fixed to one end of the rod 28 as shown and engages with a groove 32 formed in one element of the threading die or rotatable chuck. The action of this device is such that upon axial motion of the threading die toward the work, the nut pair 30 will in proper time engage the right angled end of bracket 27 arrest the axial motion of the portion of 6 having the groove 32 therein whereupon shaft 7 will move axially of the said portion and cause the chuck or die mechanism to open and release it from the work piece 4. The reverse axial motion of die mechanism 6 and spindle 7 will in due time cause the nut pair 29 to engage the right angled end of the bracket 27 and cause the chuck or die mechanism to close making it ready for the next operation.

Means for rotating headstock 2, threading die 6 and cam 17 are provided and in the instant illustration is shown schematically. Cam 17 is provided with a sprocket 33, shaft 7 with a sprocket 34 and shaft 1 with a sprocket 35. A drive motor 36 has a power transmitting means connected thereto in the form of a shaft 37 having suitable sprockets thereon aligned with the sprockets 33, 34 and 35 and connected respectively thereto by means of power transmitting elements 38, 39 and 40. These devices are so proportioned that proper speed ratios and directions of travel will be maintained for the several parts of the operating mechanism.

The character of the work piece shown is such that at its reduced diameter end it is apt to break as shown, e. g., in Fig. 2. The physical strength of the work piece at its point of juncture with bar stock 5 is such that it at times is unable to withstand the thrust of the cutting tool or threading die applied thereto and may break off for any one of a number of reasons. Whenever this occurs the work piece remains in and may be misaligned with respect to the threading die 6 and upon forward motion thereof will, unless interrupted, seriously interfere with an advancing work piece 5 impairing the continued operation of the machine. Whenever this occurs there will be a relative movement between yoke support 13 and rod 20 against the compression of spring 24 and means have been provided that depend upon this relative movement to arrest the motion of drive motor 36 to stop the machine thereby to enable the operator to easily remove the offending work piece.

As previously intimated, when a severed piece remains in the die, the next advancing work piece encounters the retained severed piece. The yieldable connection allows the yoke 13 and rod 20 to move relatively of each other but gives no assurance of preventing machine breakage. It is necessary to stop the machine in order to do so. The means for effecting the stopping of motor 36 is actuated by reason of the relative motion of the two parts and therefore functions as a positive insurance against breakage.

The above means comprises a switch 41 pivotally mounted on a suitable bracket 42 threaded or otherwise secured to the upper side of yoke support 13. The bracket is preferably a rod threaded at its free end and on which end a clamp 43 holding switch 41 is mounted, the switch being held in place by clamp screw 44 arranged as shown. The switch clamp is pivoted on bracket 42 between nut elements 45, 46 and 47, the latter two functioning as a locking element to keep the switch in position.

The switch as viewed in Figs. 1, 2, 3 and 4 is during operation of the safety device rotated in a counterclockwise direction and is urged to do so by spring 48. This spring is connected at its one end to a support or rigid bar element 49 firmly secured to switch clamp 43 and swingable therewith. The other end of spring 48 is secured to the yoke support 13. To keep the switch 41 horizontal, as well as the bar 49, it is caused to rest upon a bracket 50 associated with the outer end of bar 20. This bracket comprises a supporting plate 51 held between two of the nut elements 22 on the outer end of bar 20. This support 51 has a spring pressed pivoted element 52 thereon, the spring 53 urging the element 52 in a clockwise direction (see Fig. 5) about pivot pin 54 against stop element or pin 55.

The action of the foregoing structure is such that when relative motion takes place between bar 20 and yoke support 13 the element 52 and bar 49 will separate, the latter eventually sliding off of the element 52. When this occurs spring 48 pivots switch clamp 43 as previously described and opens switch 41. Switch 41 is shown as of the mercury type, is closed when in the horizontal position, and when rotated counterclockwise as shown in Figs. 2 and 4, will be in an open position. When the switch is restored to the closed position, after the parts 20 and 13 have been restored to normal operating conditions, element 52 is rotated counterclockwise to allow the bar 29 and switch 41 to be tilted above 52, whereupon the latter is restored to its normal position as more clearly shown in Fig. 5 and bar 49 is again brought to rest on the upper edge of element 52.

The motor circuit for simplicity of illustration is schematically illustrated and comprises power supply lines 56 and 57. One of the lines 56, has conductor 58 connected thereto leading to one side of switch 41. Conductor 59 leads from the other side of switch 41 to one side of motor 36. Conductor 60 leads from the other side of motor 36 to one of the contacts of relay 61 and conductor 62 leads from the other contact of the relay 61 to power line 57, through coil 63. The armature 64 has contact bridging element 65 secured thereto and spring 66 is adapted to open the contactor whenever coil 63 is de-energized by the opening of the switch 41.

That which is regarded new, novel and useful and which is sought to be protected by Letters Patent of the United States is as follows:

1. In an automatic screw machine safety device; a die mechanism and a work holder structure movable toward and away from each other; means including a motor to reversely move said die mechanism, said means including a rotatable cam element driven by the motor, a rod driven by the cam element, means connecting said cam and rod to actuate the rod, a yoke connecting said rod and die mechanism and movable by said rod, and said rod and said yoke being so constructed and arranged as to move relatively of each other; means to arrest the motion of said rod when said yoke and rod move relatively of each other; the last said means comprising; a switch mounted on said yoke and included in the power circuit for said motor, the said switch cooperating with said rod whereby the switch will be opened when said rod and yoke move relatively of each other to thereby stop said motor and arrest the motion of said rod.

2. In a safety device for an automatic screw machine; a frame structure; a support rigidly fixed to said frame; a yoke and its supporting element slidably mounted on said support; a work engaging structure operatively connected to said yoke; a rod means associated with said yoke adapted for relative movement therewith; means to move said rod, said rod slidably mounted in said frame; a motor to drive said means; a switch on said yoke included in the circuit for said motor, and means to open said switch upon relative movement of said rod and yoke which includes a bar associated with said switch and a bracket associated with said rod, said rod normally resting on said bracket and when said rod and yoke move relatively of each other said bar is disengaged from said bracket allowing said switch to open thereby stopping said motor.

3. In a machine tool safety device; a frame; a work engaging device; a support means on which to slide said work engaging device with respect to said frame; means including a rod to reversely slide said work engaging device with respect to said frame and said support means; means connecting said means to reversely slide said work engaging device which includes a yoke support; means associated with said yoke to loosely receive said rod; resilient means interposed between said rod and yoke to resist said yoke and rod normally moving relative to each other; a circuit breaker supported on said yoke; and means fixed on said rod engaging means associated with said circuit breaker; said fixed means disengaging said associated means whereby said circuit breaker will open when said rod and said yoke move relatively of each other.

4. In a machine tool safety device; a frame; a reversely slidably movable spindle mounting a work engaging tool; a support associated with said frame on which said spindle is slidably mounted; a rod element reciprocably supported with respect to said frame; means to reciprocate said rod; a motor to drive said means; means connecting said rod and said spindle including a yoke element, said yoke and said rod adapted to move relatively of each other when the forward motion of said spindle is interrupted; a switch pivotally associated with said yoke; means on said rod to hold said switch in a closed position; said switch openable when said rod and yoke move relatively of each other when the forward motion of said spindle is interrupted; and said switch included in the circuit for said motor thereby stopping said motor when said rod and yoke move relatively of each other to open said switch.

5. In a safety device for a machine tool of the screw machine type; a machine frame; a slide support secured to said frame; a work engaging assembly slidable on and with respect thereto; a rod slidable with respect to said frame; cam means to slide the rod; a motor to rotate said cam; a yoke associated with said rod and secured to said work engaging assembly, said rod and said yoke loosely fitting; a spring means to keep said rod and yoke normally in rigid engagement; a switch and supporting clamp pivotally mounted on said yoke; a bar element projecting from said switch clamp; means on said rod supporting said bar to hold said switch in a closed position; and means to open said switch when said yoke and rod move relatively of each other whereupon said bar element and said means separate to thereby enable said switch to open; said switch included in the circuit for said motor.

6. In a machine tool safety mechanism; a work holder and a threading die movable axially of each other; a spindle on which said die is mounted; means to rotate said spindle; means to reciprocate said die and spindle; said means including a yoke structure having a rod extended therethrough; a yieldable connection between said rod and yoke; a switch mounted on said yoke; means on said rod to keep said switch closed; and said rod and yoke moving relatively of each other when said spindle is prevented from moving on its own axis when a prematurely severed work piece is in said die.

7. In a machine tool safety device; a work holder and a work engaging tool movable axially of each other; means to advance the said tool axially relatively of said work holder; said means including a relatively movable yoke and rod structure interposed between the yoke and rod;

yieldable means interposed between the rod and yoke to resist relative movement of the rod and yoke under normal operating conditions; and switch means connected between said rod and yoke openable whenever said rod and yoke move relatively of each other against said yieldable means under abnormal operating conditions to stop the relative motion of said tool and said work holder.

8. In a machine tool safety device; a work holder and a work engaging tool movable relatively of each other; means to produce a relative motion between said work holder and said tool including a motor; a control circuit for said motor; said means including relatively movable rod and yoke elements, said elements resisting said relative movement by resilient means interposed between said rod and yoke; a switch mounted on one of said elements; means on the other of said elements to normally maintain said switch in a closed condition; and means associated with said switch and the other of said elements to cause said switch to open whenever said elements move relative to each other thereby stopping said motor.

9. In a safety device for a machine tool of the screw machine type; a work holding device; a tool for performing a machining operation; means for supporting said tool and moving it with respect to said work holding device; a support for said means; a yoke on said means and movable with respect to said support; a rotatable cam; a rod reciprocated by said cam and operably associated with said yoke; a resilient means urging said rod and yoke into substantially rigid engagement; a motor to rotate said cam; a control circuit for said motor; a switch in said control circuit, said switch fixed to said yoke; means on said rod to keep said switch normally closed and said yoke and rod moving relatively of each other against said resilient means whenever motion between said tool and work holding device is arrested and thereby opening said switch to stop said motor.

10. In a machine tool safety device, a work holder and a work engaging tool, means to move said work holder and said tool toward and away from each other which includes a motor and relatively movable rod and yoke elements, means to urge said elements into mechanical engagement with each other to move said work holder and said tool toward and away from each other, a control circuit for said motor, a switch associated with one of said rod and yoke elements, means associated with the other of said rod and yoke elements to maintain said switch in a normally closed condition, and said switch included in the control circuit for said motor, said switch opening whenever said rod and yoke elements move relatively of each other thereby stopping said motor.

11. In a safety device for a machine tool of the screw machine type, a work holder, a work engaging tool device, means on which to reciprocate said tool device toward and away from said work holder, means to reciprocate said tool device toward and away from said work holder including relatively movable rod and yoke transmitting elements, a resilient means keeping said rod and yoke elements normally operating as a substantially rigid unit, a motor to drive said transmitting elements, a control circuit for said motor, a switch in said control circuit positioned at the connection between the said rod and yoke elements, the said switch opening when said elements move relative to each other, and said rod and yoke elements moving relative to each other whenever motion between said tool device and said work holder is arrested.

12. In an automatic screw machine, in combination, a work holder and a threading die, drive means to rotate the holder and the die in unison, supporting means for the threading die, actuating means to move the supporting means toward and away from the work holder, means operated by the drive means to operate the actuating means, the actuating means and the supporting means so constructed and arranged relative to each other that the said means will move relative to each other when the die is operating on a defective piece of work, means mounted on one of the last said means and cooperating with the other of the last said means to effect a stoppage of the drive means when the said relative movement of the supporting and actuating means occurs.

ARTHUR VAJDA.